(12) United States Patent
Coney

(10) Patent No.: US 6,994,331 B2
(45) Date of Patent: Feb. 7, 2006

(54) VAPOR-LIQUID CONTACT TRAYS FOR MASS TRANSFER COLUMN AND METHOD EMPLOYING SAME

(75) Inventor: Eddie F. Coney, Arlington, TX (US)

(73) Assignee: Koch-Glitsch, LP, Wichita, KS (US)

( * ) Notice: Subject to any disclaimer, the term of this patent is extended or adjusted under 35 U.S.C. 154(b) by 5 days.

(21) Appl. No.: 10/828,568

(22) Filed: Apr. 21, 2004

(65) Prior Publication Data

US 2004/0212105 A1      Oct. 28, 2004

Related U.S. Application Data

(60) Provisional application No. 60/464,470, filed on Apr. 22, 2003.

(51) Int. Cl.
*B01F 3/04* (2006.01)

(52) U.S. Cl. ................................. 261/114.1; 261/114.5

(58) Field of Classification Search ............... 261/79.2, 261/114.1, 114.2, 114.3, 114.4, 114.5; 202/158; 203/71
See application file for complete search history.

(56) References Cited

U.S. PATENT DOCUMENTS

RE22,946 E * 12/1947 Glitsch .................... 261/114.1
2,711,307 A    6/1955 Milmore (Continued)

FOREIGN PATENT DOCUMENTS

CH      253469      3/1948

(Continued)

*Primary Examiner*—Scott Bushey
(74) *Attorney, Agent, or Firm*—J. David Wharton; Stinson Morrison Hecker LLP

(57) ABSTRACT

A mass transfer column (20) is provided with an external shell (22) defining an open internal region (24). Centrifugal contact trays (26) and return contact trays (28) are positioned in an alternating and vertically spaced apart relationship within the open internal region (24). Each contact tray (26) and (28) has a plurality of vapor passages (34) for allowing vapor to flow upwardly through the tray deck (30) and (31), respectively, to interact with liquid on the surface of the tray deck. At least one center downcomer (42) extends downwardly at an opening in the return tray deck (31) and has a lower discharge outlet (54). At least one annular downcomer (38) extends downwardly the periphery of the centrifugal tray deck (30) and has a lower discharge outlet (48) spaced above the return tray deck (31) for feeding liquid onto the return tray deck (31). A plurality of baffles (60) extend upwardly from the return contact tray (28) at the center downcomer (42) and transfer a portion of the load of the centrifugal contact tray to the return contact tray. A center support plate (58) is positioned between upper ends of the baffles (60) and the overlying centrifugal contact tray (26) to provide a greater area of support. A support ring (66) is secured to the column shell (22) and a pair of support beams (62) is secured to the support ring (66) and the center downcomer (42) to transfer the load to the column shell (22). Bolting clips (71) extend between the annular downcomer (38) and another support ring (70) to transfer another portion of the centrifugal contact tray load to the column shell (22).

21 Claims, 3 Drawing Sheets

U.S. PATENT DOCUMENTS

| | | | |
|---|---|---|---|
| 2,916,272 A | * 12/1959 | Ragatz | 261/114.1 |
| 3,028,151 A | * 4/1962 | Kittel | 261/155 |
| 3,045,989 A | 7/1962 | Kittel | |
| 3,338,566 A | * 8/1967 | Kittel | 261/113 |
| 4,201,628 A | * 5/1980 | Church et al. | 202/158 |
| 5,047,179 A | * 9/1991 | Nye | 261/114.1 |
| 5,534,233 A | * 7/1996 | Yamamoto et al. | 422/191 |
| 6,736,378 B2 | * 5/2004 | Colic et al. | 261/114.1 |
| 2003/0010478 A1 | 1/2003 | Colic et al. | |
| 2004/0080059 A1 | * 4/2004 | Weiland et al. | 261/79.2 |

FOREIGN PATENT DOCUMENTS

DE         641814         2/1937

* cited by examiner

VAPOR-LIQUID CONTACT TRAYS FOR MASS TRANSFER COLUMN AND METHOD EMPLOYING SAME

CROSS-REFERENCE TO RELATED APPLICATION

This application claims the benefit of provisional application Ser. No. 60/464,470, filed Apr. 22, 2003.

BACKGROUND OF THE INVENTION

This invention relates generally to mass transfer columns and, more particularly, to an apparatus and method for supporting trays within such columns.

Mass transfer columns, including heat exchange columns, typically include an upright shell and a plurality of horizontally disposed trays that are positioned within the shell and are used to facilitate mass or heat transfer between fluid streams flowing within the column. The fluid streams are normally one or more downwardly flowing liquid streams and one or more ascending vapor streams, although other combinations of fluid streams are possible. Each tray includes a plurality of vapor passages that allow the vapor stream to ascend through the tray for interaction with the liquid stream flowing across an upper surface of the tray. A plurality of such trays are normally supported in vertically spaced relationship by support rings that are welded to the inner surface of the shell and underlie the outer peripheral edge portion of the trays.

In the type of vapor-liquid contact trays disclosed in U.S. Pat. No. 3,045,989 to Kittel, a center downcomer and an outer annular downcomer are provided on alternate trays. As a result of this downcomer arrangement, liquid flows radially or along a spiral flow path from the center to the perimeter of alternating trays known as centrifugal contact trays and then from the perimeter to the center of the remaining trays known as return contact trays. Conventionally, a center support pipe that extends longitudinally along the center upright axis of the column carries support rings that are used to provide center support for the centrifugal trays. The use of this center support pipe, however, reduces tray capacity because it occupies a portion of the center downcomer on the return trays as well as a portion of the tray deck on the centrifugal trays. Installation of the center support pipe can also be problematic because it is often too long to be inserted in one piece through the entry manholes. As a result, the center support pipe must be divided into a number of shorter length segments that can be carried into the column and reassembled by welding the segments together end to end. Further installation delays result from the need to position support beams within the column to support the lower end of the center support pipe and from the need to position and weld tray support rings on the center pipe. The center downcomer must also be assembled around the center support pipe, causing further delays during installation of the trays.

A need has thus developed for a way to support centrifugal and return contact trays of the type described above without using a center support pipe.

SUMMARY OF THE INVENTION

In one aspect, the invention is directed to a mass transfer column having an external shell defining an open internal region. Return contact trays and centrifugal contact trays are positioned in an alternating and vertically spaced apart relationship within the open internal region. The return contact tray has a tray deck with at least one opening for removing liquid from an upper surface of the tray deck and a plurality of vapor passages for allowing vapor to flow upwardly through the tray deck to interact with liquid on the upper surface of the return tray deck. The centrifugal tray deck has a tray deck with an upper surface, a periphery and a plurality of vapor passages for allowing vapor to flow upwardly through the tray deck to interact with liquid on the upper surface of the centrifugal tray deck. At least one center downcomer extends downwardly at the opening in the return tray deck and has a lower discharge outlet. At least one annular downcomer extends downwardly at the periphery of the centrifugal tray deck and has a lower discharge outlet spaced above the return tray deck for feeding liquid onto the return tray deck. A pedestal comprising a plurality of baffles extends upwardly from the return contact tray and supports the overlying centrifugal tray. The baffles are supported at their lower ends by the center downcomer and are preferably radially oriented. A center support plate is preferably positioned between a top edge of the baffles and an undersurface of the tray deck of the overlying centrifugal contact tray to provide a larger support surface for the centrifugal contact tray. Some of the load of the centrifugal contact tray is transferred by the baffles to the center downcomer on the underlying return contact tray. Horizontal support beams secured to the center downcomer then transfer the load to a support ring secured to the column shell.

In another aspect, the invention is directed to a method of intermixing vapor and liquid streams in a mass transfer column using the vapor-liquid contact trays described above. The invention is also directed to vapor-liquid contact tray units.

BRIEF DESCRIPTION OF THE SEVERAL VIEWS OF THE DRAWINGS

In the accompanying drawings which form part of the specification and are to be read in conjunction therewith and in which like reference numerals are used to indicate like parts in the various views.

DETAILED DESCRIPTION OF THE INVENTION

Figure 1:
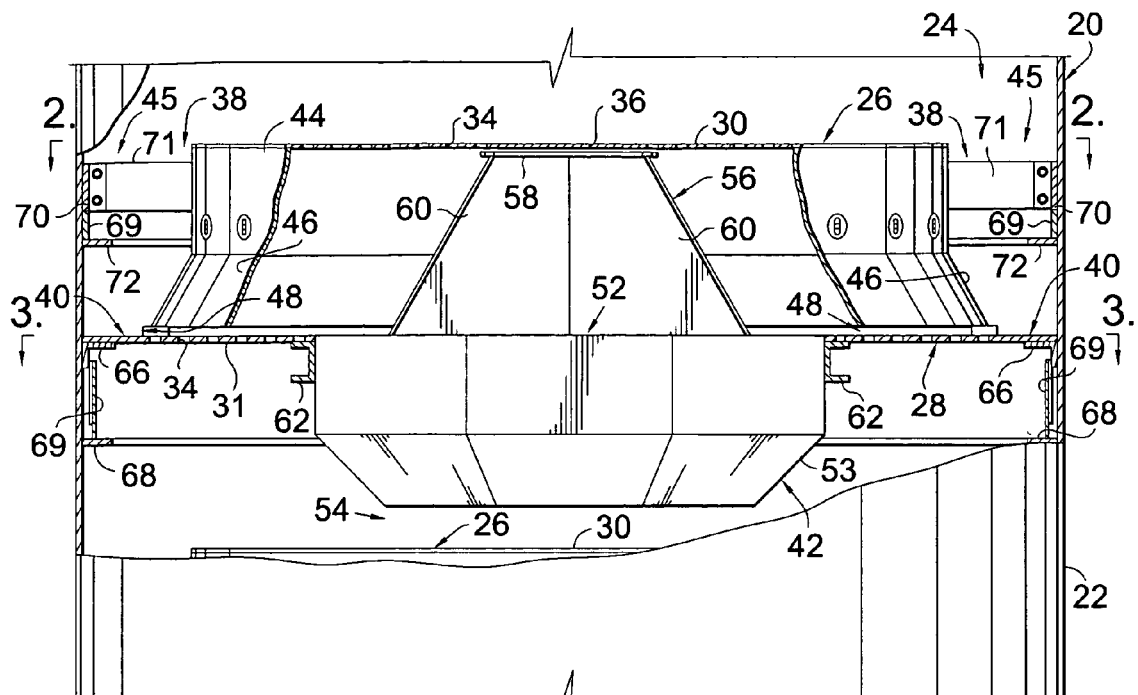
FIG. 1 is fragmentary side elevation view of a mass transfer column taken in vertical section to show a centrifugal contact tray and an underlying return contact tray with portions of the centrifugal contact tray broken away to illustrate how the centrifugal contact tray is supported on the return contact tray in accordance with the present invention.

Turning now to the drawings in greater detail and initially to FIG. 1, a column used in mass transfer and heat exchange processes is represented generally by the numeral 20. Column 20 includes an upright, external shell 22 that is generally cylindrical in configuration, although other configurations such as polygonal can be used and are within the scope of the invention. Shell 22 is of a height and diameter necessary for the processes occurring within the column 20. The shell 22 is formed of a metal or other suitably rigid materials that are inert to, or otherwise compatible with, the fluids and conditions present within the column 20.

Column 20 is used for processing fluid streams, typically liquid and vapor streams, to obtain fractionation products and/or otherwise to cause mass transfer or heat exchange between the fluid streams. An open internal region 24 is defined by the shell 22 and contains various mass transfer devices used to facilitate the desired mass transfer and/or heat exchange. Normally, the fluid streams comprise one or more descending liquid streams and one or more ascending vapor streams. Alternatively, the fluid streams may both be liquid streams or a gas stream and a liquid stream.

The fluid streams are directed to the column 20 through any suitable number of feed lines positioned at preselected locations along the height of the column 20. One or more vapor or gas steams can also be generated within the column 20 rather than being introduced into the column through a feed line. The column 20 typically includes an overhead line for removing a vapor product or byproduct and a bottom stream takeoff line for removing a liquid product or byproduct from the column 20. The various feed lines and removal lines, as well as other column components that are typically present, such as reflux stream lines, reboilers, condensers, vapor horns and the like, are not shown in the drawings because they are conventional in nature and their illustration is not believed to be necessary for an understanding of the present invention.

Figure 2:
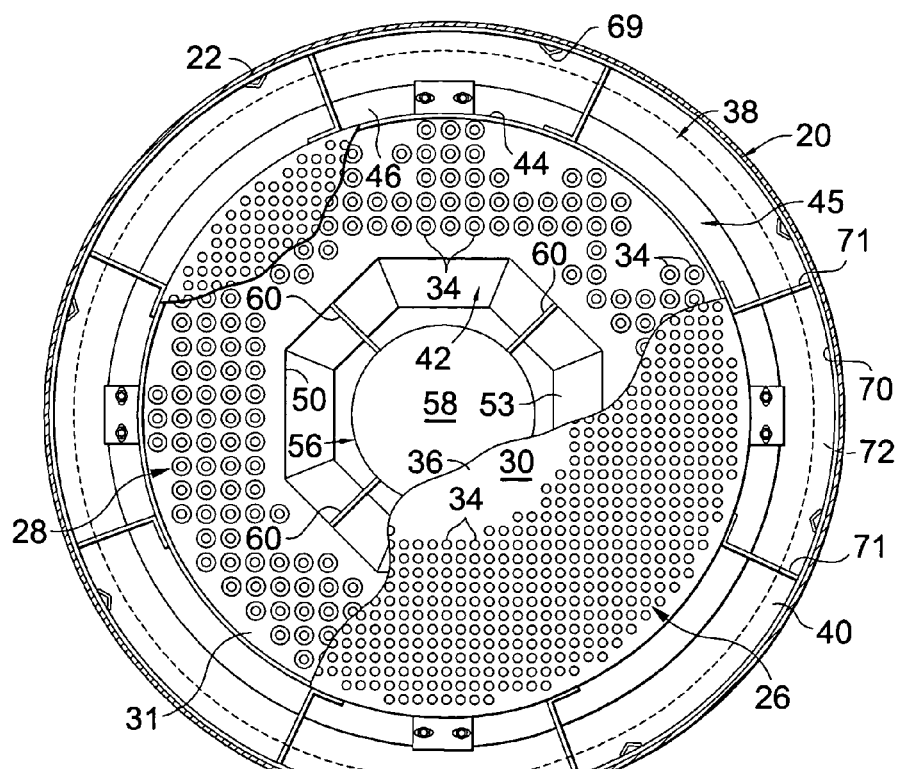
FIG. 2 is a top plan view of the centrifugal tray taken in horizontal section along line 2—2 of FIG. 1 in the direction of the arrows, a portion of the centrifugal tray deck being removed to better illustrate the underlying return tray.
Figure 3:
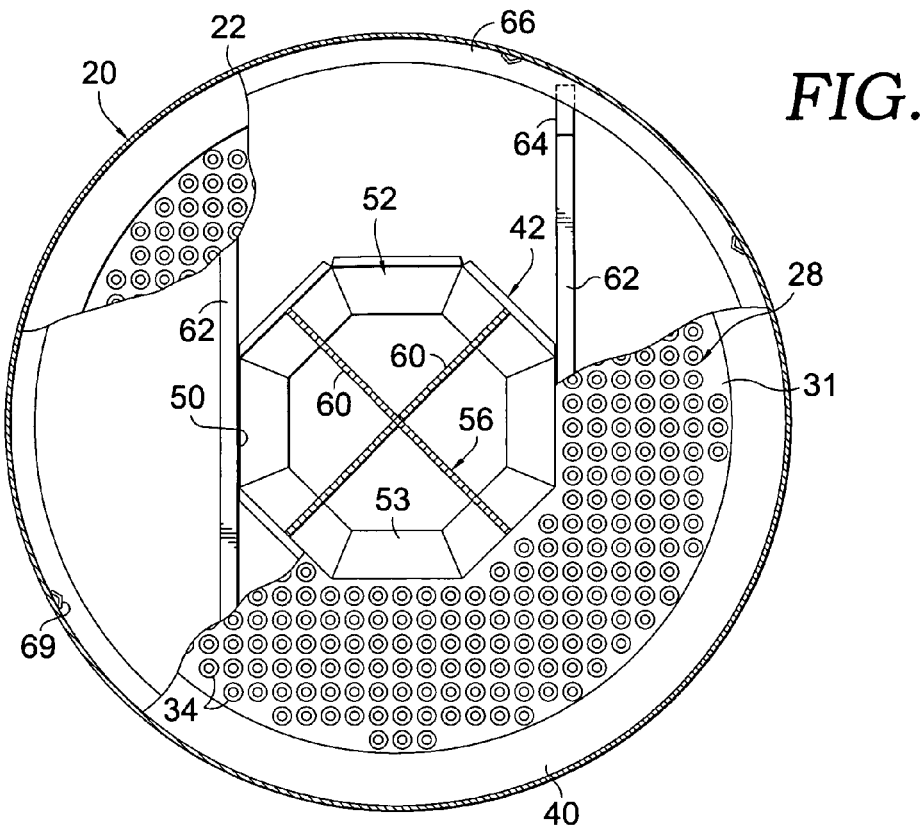
FIG. 3 is a top plan view of the return tray taken in horizontal section along line 3—3 of FIG. 1 in the direction of the arrows, a portion of the return tray deck being removed to show the positioning of a pair of support beams.

A plurality of horizontally extending centrifugal contact trays 26 and return contact trays 28 are positioned within the open internal region 24 in vertically spaced apart and alternating relationship. With reference to FIGS. 2 and 3, each tray 26 and 28 comprises a horizontally extending tray deck 30 and 31, respectively, preferably constructed from a plurality of individual panels that are joined together in a known fashion. The tray decks 30 for the centrifugal contact trays 26 are generally circular but can be polygonal or other configurations. The tray decks 31 for the return contact trays 28 preferably have a shape complementary to the configuration of the column shell 22. Each tray deck 30 and 31 contains a plurality of vapor passages 34 that allow vapor to pass upwardly through the tray decks 30 and 31 for interaction with liquid flowing across the upper surface of the tray decks 30 and 31. The vapor passages 34 may be simple sieve holes but can be other constructions such as fixed or movable valves. Preferably, the vapor passages 34 are constructed to push liquid across the tray deck 30 in a preselected direction. In the case of the centrifugal contact trays 26, the vapor preferably exits the vapor passages 34 with a tangential flow component to cause the liquid to swirl outwardly from the center to the perimeter of the tray deck 30. In the return contact trays 28, the vapor preferably pushes the liquid radially inwardly from the perimeter to the center of the tray deck 31.

Turning to FIG. 1, each centrifugal contact tray 26 has a center liquid inlet area 36 and an outer annular downcomer 38 that is formed along an outer perimeter of the tray deck 30. The return contact trays 28 each have an outer, usually ring-shaped liquid inlet area 40 that underlies the annular downcomer 38 from the overlying centrifugal contact tray 26 and a center downcomer 42 that overlies the inlet area 36 of the underlying centrifugal contact tray 26. As a result of this construction, liquid flows outwardly from the center inlet area 36 of the uppermost centrifugal contact tray 26, crosses the tray deck 30 along a radial or spiral flow path, and enters the annular downcomer 38. The liquid then travels downwardly through the annular downcomer 38, is discharged onto the ring-shaped inlet area 40 of the underlying return contact tray 28, and flows radially inwardly along the tray deck 31 to the center downcomer 42. Liquid entering the center downcomer 42 travels downwardly and is discharged onto the center inlet area 36 of the underlying centrifugal contact tray 26. Although only one pair of trays 26 and 28 is illustrated in the drawings, it is to be understood that column 20 will normally include numerous such trays and the liquid flow path described above will be repeated for the successive underlying trays.

The inlet areas 36 and 40 on the contact trays 26 and 28 are preferably imperforate to prevent liquid from weeping through the inlet areas 36 and 40 as a result of the downward momentum of the liquid. Other means for preventing or impeding liquid weeping can be utilized in place of or in combination with the imperforate inlet areas 36 and 40. As one example, one or both of the inlet areas 36 and 40 can be raised above the plane of the tray deck 30 to allow vapor to flow upwardly through the area of the tray deck 30 underlying the raised inlet areas 36 and 40. Alternatively, one or both of the inlet areas 36 and 40 may be lowered below the plane of the tray deck 30 to form a sump.

Figure 5:
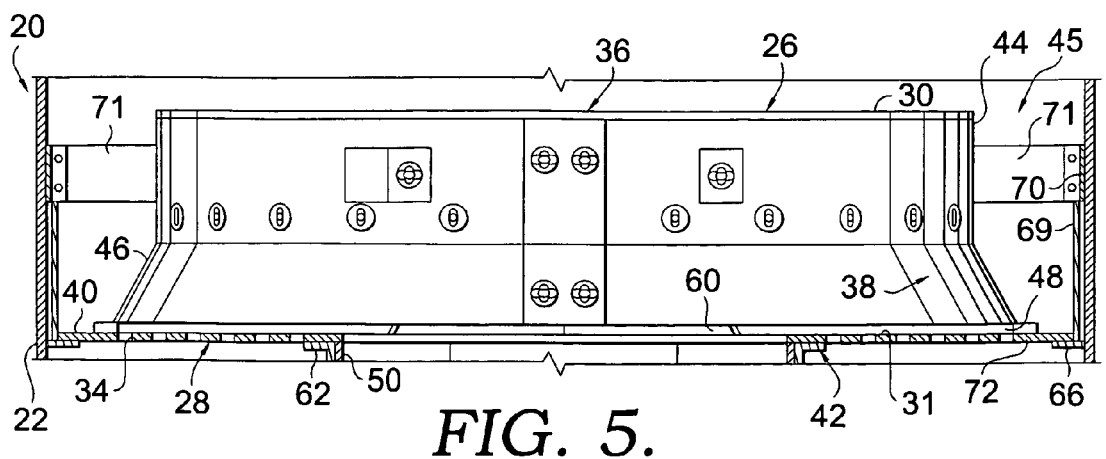
FIG. 5 is a fragmentary side elevation view of the column similar to the view shown in FIG. 1 but showing a different arrangement for supporting the centrifugal tray about its out periphery.
Figure 6:
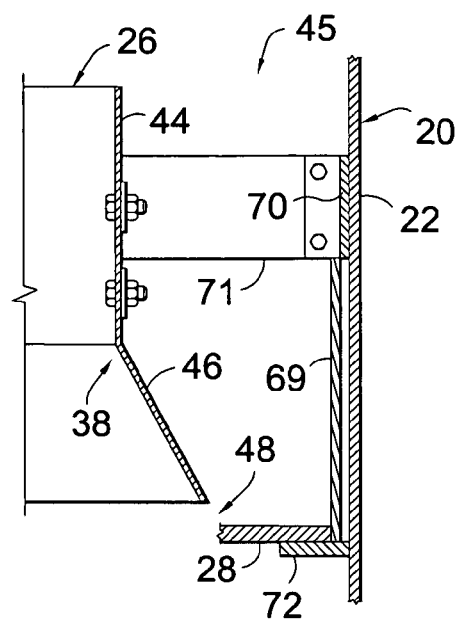
FIG. 6 is an enlarged fragmentary side elevation view of the centrifugal tray showing a bolting clip that attaches the centrifugal tray to an expansion band supported by an underlying support ring.

Turning additionally to FIGS. 5 and 6, the annular downcomers 38 each have a vertically extending inlet wall 44 that extends downwardly from the outer perimeter of the tray deck 30. The inlet wall 44 is a single circular wall but may also have a polygonal or multi-segmented shape formed from a plurality of planar or curved sections. The inlet wall 44 is spaced inwardly a preselected distance from the column shell 22 to form a downcomer inlet 45 in the spacing between the inlet wall 44 and the column shell 22. A lower skirt 46 extends downwardly from a lower edge of the inlet wall 44 and is angled toward the column shell 22. A lower edge of the skirt 46 is spaced a preselected vertical distance above the plane of the underlying tray deck 30 to define a downcomer outlet 48. The skirt 46 is a single planar ring, but can also have a polygonal or multi-segmented shape.

As can best be seen in FIGS. 1 and 3, the center downcomer 42 on each return contact tray 28 has an inlet wall 50 that forms an inlet 52 in the plane of the tray deck 30 and extends vertically downward to an inclined wall 53 that slopes inwardly toward a center axis of the column 20. The inclined wall 53 preferably has an inverted frusta-conical shape formed by multiple flat panels joined together. A discharge outlet 54 for the center downcomer 42 is formed by the preselected vertical spacing between a lower edge of the inclined wall 53 and the underlying tray deck 30. Alternatively, a vertical skirt of cylindrical or other construction may extend downwardly from a lower edge of the inclined wall 53 to form the outlet 54 and/or the inlet wall 50 may be omitted with the inclined wall 53 forming the inlet 52 of the center downcomer 42. Other constructions for the annular and center downcomers 38 and 42 are possible and are within the scope of the present invention.

Figure 4:
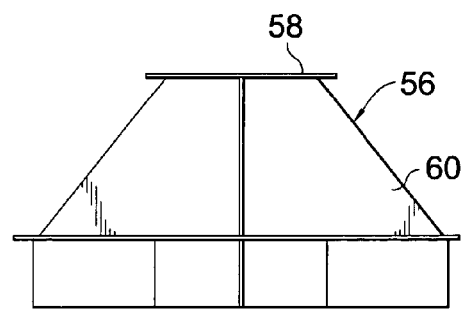
FIG. 4 is a side elevation view of a pedestal portion of the return tray that supports the overlying centrifugal tray.

Rather than using a vertically extending center support pipe to support the centrifugal contact trays 26 in the conventional manner, the present invention supports each centrifugal contact tray 26 on the immediately underlying return contact tray 28. A support pedestal 56 shown in FIGS. 1, 3 and 4 extends upwardly from the return contact tray 28 to provide this support. The support pedestal 56 includes a center support plate 58 that underlies and supports the tray deck 30 of the overlying centrifugal contact tray 26. The center support plate 58 has a circular configuration, but can be other shapes if desired. The support pedestal 56 also includes a plurality of upright, generally planar anti-jump baffles 60 that span the center downcomer 42 on the return contact tray 28. The anti-jump baffles 60 are secured at their lower ends to the inlet wall 50 of the center downcomer 42 using nut and bolt assemblies, although other attachment locations and methods are possible. Four anti-jump baffles 60 that extend radially outward from the center vertical axis of the center downcomer 42 at 90° spacings are illustrated in the drawings, but it is to be understood that more or fewer baffles 60 can be used. In addition to their support function, the anti-jump baffles 60 interrupt the horizontal momentum of liquid flowing inwardly along the tray deck 31 of the return contact tray 28 to prevent the liquid from "jumping" across the inlet 52 of the center downcomer 42. The base of each baffle 60 preferably has a greater horizontal dimension that the upper end thereof.

Figure 7A:
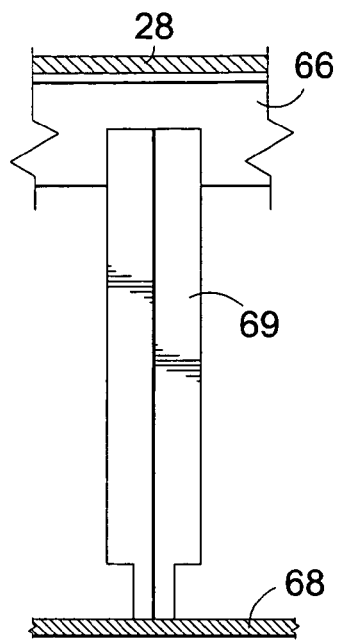
FIGS. 7A–C are side elevation, top plan and end elevation views showing a support used to support the expansion band on the underlying support ring.
Figure 7B:
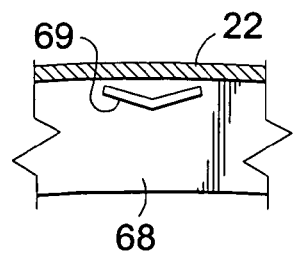
Figure 7C:
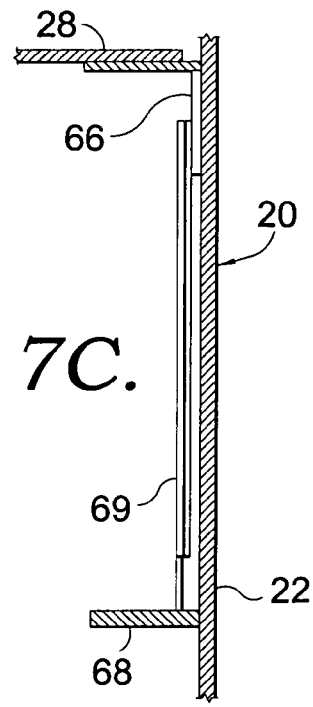

As best seen in FIGS. 1 and 3, the load transferred to the return contact tray 28 by the support pedestal 56 is carried in part by a pair of horizontal support beams 62 that extend in parallel relationship on opposite sides of the center downcomer 42 just below the tray deck 30. The support beams 62 are attached to the inlet wall 50 of the center downcomer 42 and are secured at their ends to support clips 64 carried (FIG. 3) by a support ring 66 extending around all or part of the inner circumference of the column shell 22. The support beams 62 can alternatively be formed as an integral part of the tray deck 30, thus eliminating the need for a separate beam and the support clips 64. The support ring 66 also underlies and supports the outer perimeter of the tray deck 31 of the return contact tray 28. The support ring 66 thus supports substantially the entire load of the return contact tray 28 and a substantial part of the load of the overlying centrifugal contact tray 26. The support ring 66 can be welded to the column shell 22 or it can be of type known as an expansion ring that is supported by an adjacent support ring 68 welded to the column shell 22 as shown in FIG. 1. An example of a support 69 that interconnects the expansion ring 66 with the adjacent, in this case underlying, support ring 68 is illustrated in FIGS. 7A–C. Expansion rings are commonly used during column revamps when the vertical spacing between the trays 26 and 28 is varied from that initially used in the column.

Turning additionally to FIGS. 2, 5 and 6, each centrifugal contact tray 26 is also supported by another support ring 70 that carries a plurality of circumferentially spaced bolting clips 71 that extend radially inwardly from the support ring 70 and are secured to the inlet wall 44 of the annular downcomers 38. The bolting clips 71 have a 90° flange at their inner end to facilitate bolting of the clips 71 to the inlet wall 44. The vertical dimension of the bolting clips 71 is preferably less than the vertical dimension of the inlet wall 44 so that the bolting clips 71 do not unnecessarily impede the swirling motion and mixing of liquid in the annular downcomer 38. The number and spacing of the bolting clips 71 can be varied depending upon the load conditions. The support ring 70 can be welded to the column shell 22 or it can be in the form of an expansion ring. Preferably, the support ring 70 is in the form of an expansion band that does not have a radially extending flange that would otherwise interfere with liquid flow into the annular downcomer 38. The expansion band is supported by circumferentially spaced supports 69 that interconnect the expansion band with the adjacent welded support ring 72.

It can thus be seen that the centrifugal contact trays 26 are supported about their outer perimeter by the bolting clips 71 and support ring 70. The support pedestal 56 that transfers the load to the underlying return contact tray 28 provides center support for each centrifugal contact tray 26. The return contact tray 28, in turn, is supported along intermediate portions of the tray deck 30 by the support beams 62 and about its perimeter by the support ring 68. By supporting the trays 26 and 28 in this manner, the need for and problems attendant to use of a convention center support pipe are eliminated.

From the foregoing, it will be seen that this invention is one well adapted to attain all the ends and objectives hereinabove set forth together with other advantages which are inherent to the structure.

It will be understood that certain features and subcombinations are of utility and may be employed without reference to other features and subcombinations. This is contemplated by and within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A mass transfer column comprising:
    an external shell defining an open internal region;
    at least one return contact tray and at least one overlying centrifugal contact tray positioned in an alternating and vertically spaced apart relationship within the open internal region,
    said return contact tray comprising a tray deck having at least one opening for removing liquid from an upper surface of said return tray deck and a plurality of vapor passages for allowing vapor to flow upwardly through said return tray deck to interact with liquid on said upper surface of said return tray deck,
    said centrifugal contact tray comprising a tray deck having an upper surface, a periphery and a plurality of vapor passages for allowing vapor to flow upwardly through said centrifugal tray deck to interact with liquid on said upper surface of said centrifugal tray deck;
    at least one center downcomer extending downwardly at said opening in said return tray deck, said center downcomer having a lower discharge outlet;
    at least one annular downcomer extending downwardly at said periphery of said centrifugal contact tray deck and having a lower discharge outlet spaced above said return tray deck for feeding said liquid onto said return tray deck; and
    a plurality of baffles extending upwardly from said return contact tray at said center downcomer and supporting said overlying centrifugal contact tray.

2. The mass transfer column of claim 1, wherein said center downcomer has an inlet wall and said baffles each have a lower end coupled with said inlet wall and an upper end.

3. The mass transfer column of claim 2, further comprising:
a pair of support beams that extend horizontally in a parallel relationship on opposite sides of the center downcomer below the return tray deck and are secured to portions of said inlet wall of the center downcomer, each beam having opposite ends supported by said column shell.

4. The mass transfer column of claim 3, further comprising:
a first support ring extending around at least a portion of said column shell and wherein said support beams are secured at said opposite ends to said first support ring.

5. The mass transfer column of claim 4, wherein said support beams are formed as an integral part of the return contact tray.

6. The mass transfer column of claim 4, wherein said first support ring is an expansion ring.

7. A mass transfer column of claim 6, wherein said expansion ring is supported by one or more supports that interconnect with the expansion ring and an adjacent support ring secured to the column shell.

8. The mass transfer column of claim 4, further comprising:
a second support ring that carries a plurality of circumferentially spaced bolting clips that extend radially inwardly from said second support ring and are secured to said annual downcomer.

9. The mass transfer column of claim 8, including a center support plate secured to and in underlying contact with said centrifugal tray deck of the overlying centrifugal contact tray.

10. The mass transfer column of claim 9, wherein said second support ring is an expansion ring.

11. The mass transfer column of claim 10, wherein said expansion ring is supported by one or more supports that interconnect with the expansion ring and an adjacent support ring secured to the column shell.

12. The mass transfer column of claim 1, wherein said baffles extend radially outward from a center vertical axis of the center downcomer.

13. The mass transfer column of claim 12, wherein said baffles are planar.

14. The mass transfer column of claim 13, wherein said baffles span said center downcomer.

15. The mass transfer column of claim 14, wherein each of said baffles has a lower end and an upper end, said lower end having a greater horizontal dimension than said upper end.

16. A method of supporting at least one return contact tray and at least one centrifugal contact tray having tray decks with a plurality of vapor passages, at least one center downcomer and at least one annular downcomer in a mass transfer column, the method comprising:
(a) positioning said at least one return contact tray and said at least one centrifugal contact tray in an alternating and vertically spaced apart relationship;
(b) placing a pair of support beams below said return contact tray, each beam having a first and second end;
(c) securing said first ends of said support beams to said center downcomer;
(d) extending a plurality of baffles upwardly from said at least one return contact tray, each of said baffles having an upper end and a lower end;
(e) positioning a center support plate underneath and in contact with said centrifugal contact tray deck; and
(f) securing said upper ends of said baffles to said center support plate.

17. The method of claim 16, further comprising:
extending a first support ring around at least a portion of the column shell.

18. The method of claim 16, further comprising:
securing said second ends of said support beams to said first support ring.

19. The method of claim 18, further comprising:
extending a second support ring around at least a portion of the column shell.

20. The method of claim 19, further comprising:
securing said annular downcomer to bolting clips of said second support ring.

21. The method of claim 16, further comprising:
securing said lower ends of said baffles to said return contact tray.

* * * * *